United States Patent [19]

Hodil, Jr.

[11] 4,121,715

[45] Oct. 24, 1978

[54] STACKABLE FASTENER ASSEMBLY

[75] Inventor: Elmer Raleigh Hodil, Jr., Branford, Conn.

[73] Assignee: Olin Corporation, New Haven, Conn.

[21] Appl. No.: 834,088

[22] Filed: Sep. 19, 1977

[51] Int. Cl.² .............................................. B65D 85/24
[52] U.S. Cl. .................... 206/347; 206/820; 227/136
[58] Field of Search ................. 85/17, 50 R; 206/343, 206/345–347, 820; 227/136

[56] References Cited

U.S. PATENT DOCUMENTS

| 3,212,632 | 10/1965 | Baum et al. ................ 206/347 X |
| 3,774,755 | 11/1973 | Cast et al. ...................... 206/346 |
| 3,944,068 | 3/1976 | Maier et al. .................... 206/347 |

FOREIGN PATENT DOCUMENTS 83,965  8/1975  Australia ................................. 206/347

*Primary Examiner*—Steven E. Lipman
*Attorney, Agent, or Firm*—W. W. Jones; P. J. Lerner

[57] ABSTRACT

A nail-like fastener having a substantially rectangular washer adapted to permit overlapping vertical stacking of a number of fastener/washer assemblies for use in a fastener driving apparatus of the type including a piston. The washers each include two substantially U-shaped recesses or cut-outs disposed one each near the midpoints of the top and bottom washer edges, such that the bottom fastener of a stack may be fired from the driving apparatus without disruption of the remainder of the stack.

7 Claims, 3 Drawing Figures

STACKABLE FASTENER ASSEMBLY

BACKGROUND AND SUMMARY OF THE INVENTION

The present invention relates to fasteners such as nails and the like and, more particularly, to a stack of such fasteners for use in a fastener driving apparatus.

With the advent of fast-acting fastener driving tools, there has come to be appreciated the need for a means of rapidly feeding fasteners into the tool so as to fully utilize the time-saving capabilities thereof.

Prior attempts at automating the feeding of such fasteners have involved adhering the fasteners to paper or similar strips, as seen in U.S. Pat. Nos. 3,212,632 and 3,276,576. Strips of fasteners formed in this manner are seen to suffer several shortcomings. The strips are fragile and prone to breakage, requiring operator intervention before automatic feeding may be resumed. Further, during the driving operation, wherein a fastener is torn from the assemblage, bits of strip and of the adhesive accumulate within the tool where they cause tool malfunction. Other random bits of adhesive and of the strip remain attached to the fastener, preventing complete and proper seating thereof in the receiving material. The remainder of the strip material collects in the work area whereat it constitutes an unwanted litter. Finally, formation of the strips so as to retain both the individual fasteners and the strip integrity, yet to permit the controlled removal of a single fastener by operation of the tool during the fastener driving operation, is both difficult and expensive. In addition, strips suffer from the inability to combine portions of strips to fill a magazine. Operators, coming to a momentary natural pause in their work, frequently use this opportunity to reload the tool with a fresh strip and discard the remaining portion of the previous strip. This practice is, of course, quite wasteful and expensive.

Another problem often encountered is the requirement of a guide washer for proper placement and control of the fastener in the tool barrel during the placement operation. Attempts at forming the strip to fracture at predetermined points, with the portions adjacent the fastener serving as a washer, have generally proven unsuccessful due to the wide variance in size of the washers thus produced.

U.S. Pat. No. 3,276,576 also discloses the use of washers placed on the individual fasteners and adhesively fastened together to form a continuous strip. This method, although solving the litter and guide washer problems, still suffers many of the remaining shortcomings previously described.

The several disadvantages exhibited by the prior art are overcome by the present invention wherein a stack of individual fastening assemblies is provided, each such assembly consisting of a fastener and a washer. The assemblies are arranged such that the bottom fastener of the stack may be fired from the tool without disturbing the remainder of the stack. This stacking is made possible by the novel configuration of the washer, which is generally rectangular and includes two cut-outs or recesses, disposed one each near the midpoints of the top and bottom edges, while a centrally located aperture retainingly grips the shank of the associated fastener. The fastener assemblies are stacked one atop the next, in overlapping relation, with each assembly being rearward of the one below, and the shanks of the fasteners each resting in the upper recess of the washer below. The bottom recess, which is sized to permit passage of the larger of the tool piston and the fastener head, permits the fastener head and the piston to pass through the overlapped portion of the washer of the next-to-bottom fastener assembly, whereby firing may be accomplished without disruption of the remainder of the stack.

BRIEF DESCRIPTION OF THE DRAWING

The other advantages and features of the invention will be seen from the following description taken in conjunction with the drawings, in which.

DESCRIPTION OF THE PREFERRED EMBODIMENT

Figure 2:
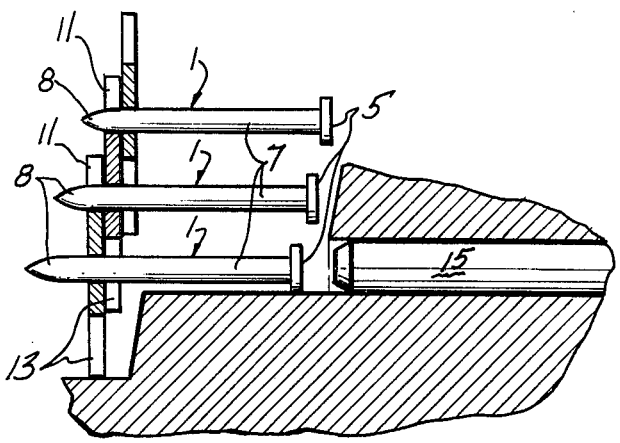
FIG. 2 is a fragmentary cut-away view of the muzzle end of a fastener driving tool showing a stack of fastener assemblies.
Figure 3:
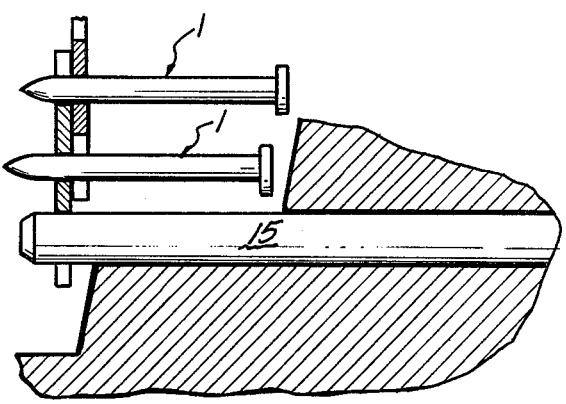
FIG. 3 is a fragmentary cut-away view, similar to FIG. 2, showing the tool after firing.

As seen in FIG. 2, the fastener assembly of the present invention consists of a nail-like or similar fastener 1 and a washer 3.

The fastener 1 consists of an enlarged head 5, a depending shank 7 and a pointed forward end 8.

The washer 3 is generally rectangular in shape and includes a central aperture 9 sized to retainingly admit the fastener shank 7.

U-shaped upper and lower cut-outs or recesses, 11 and 13 respectively, are formed near the midpoints of the upper and lower washer edges, each comprising a base portion 11a, 13a and parallel side portions 11b, 11b, 13b, 13b. The upper recess 11 is of a width permitting passage of a fastener shank 7, while the lower recess 13 is of a width permitting passage of the larger of fastener head 5 and piston 15 of the fastener driving device.

Figure 1:
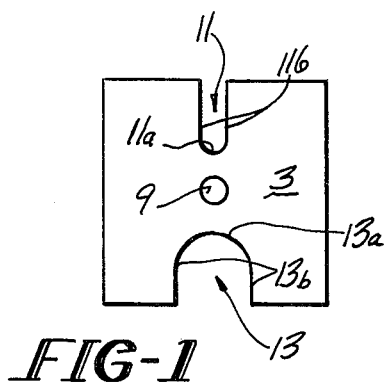
FIG. 1 is a plane view of the washer of the present invention.

As seen in FIG. 1, the fastener assemblies are stacked in vertical, overlapping relation with each assembly 3 lying rearwardly of the one below. The fastener shanks 7 lie substantially in a common plane, each resting in the upper recess 11 of the washer 3 of the next lower fastener assembly.

When the fastener driving device or tool is fired, the piston 15 is advanced forwardly (to the left as seen in FIG. 2), driving the bottom fastener assembly in the stack. The head 5 of the driven fastener 1 and the piston 15 pass through the lower recess 13 of the next higher washer 3, whereby the remainder of the fastener assemblies in the stack remain substantially undisturbed.

Upon retraction of the piston 15, preparatory to firing the next fastener assembly, the remaining assemblies in the stack drop down, thereby bringing the next assembly into proper position for firing.

Many changes and modifications in the above-described embodiment of the invention can, of course, be carried out without departing from the scope thereof. Accordingly, that scope is intended to be limited only by the scope of the appended claims.

What is claimed is:

1. A washer adapted for stacking fasteners, of the type having enlarged heads and depending shanks, for use in fastener driving apparatus of the type including a piston, said washer consisting of a generally rectangular member having an aperture proximate the center thereof, sized to retainingly admit a fastener shank, and first and second recesses, formed proximate the midpoints of opposing edges of said member; said first recess having a width permitting passage of a fastener shank, said second recess having a width greater than the width of said first recess for permitting passage of the larger of a fastener head and the piston, whereby said washer permits stacking of fasteners in the driving apparatus such that the bottom fastener of a stack may be fired therefrom while the remaining fasteners in the stack remain substantially undisturbed.

2. The invention of claim 1, wherein said recesses each include parallel side portions.

3. A stackable fastener assembly for use in fastener driving apparatus of the type including a piston, said fastener assembly consisting of a fastener and a washer; said fastener having a shank with an enlarged head at one end thereof; said washer being a generally rectangular member having an aperture proximate the center thereof and first and second recesses formed proximate the midpoints of opposing edges of said member, said first recess having a width in excess of the width of said fastener shank, said second recess having a width in excess of the width of the larger of said fastener head and the piston, said fastener shank being retainly held in said aperature, whereby a plurality of said fastener assemblies may be stacked one atop the next in overlapping relation, with said fastener shanks lying in a common plane, such that the bottom fastener of a stack may be fired from the tool while the remaining fasteners in the stack remain substantially undisturbed.

4. The invention of claim 3, wherein said recesses each include parallel side portions.

5. A stack of fasteners of the type having enlarged heads and depending shanks, said stack being adapted for use in fastener driving apparatus of the type including a piston, said stack comprising a plurality of said fasteners and a like number of washers; said washers each consisting of a member having an aperture proximate the center thereof, sized to retainingly admit the shank of one of said fasteners, and first and second recesses, formed proximate the midpoints of opposing edges of said member; said first recess having a width permitting passage of a shank of one of said fasteners, said second recess having a width permitting passage of the larger of said piston and said fastener head; one of said washers being mounted on each of said fasteners, said fasteners being vertically juxtaposed in overlapping relation with the shanks thereof lying substantially in a common plane, said washers each being disposed with said first recess uppermost, the shank of one fastener loosely resting in the first recess of the washer on the next lower fastener.

6. The invention of claim 1, wherein said washers in said stack each lie rearwardly of the next lower washer, whereby the bottom fastener may be removed from said stack by being displaced forwardly in said common plane.

7. The invention of claim 6, wherein said recesses each include a base portion and parallel side portions.

UNITED STATES PATENT AND TRADEMARK OFFICE
CERTIFICATE OF CORRECTION

PATENT NO. : 4,121,715
DATED : October 24, 1978
INVENTOR(S) : Elmer Raleigh Hodil, Jr.

It is certified that error appears in the above—identified patent and that said Letters Patent is hereby corrected as shown below:

Column 2, line 38, "FIG. 1" should read -- FIG. 2 --.

Signed and Sealed this

Twenty-eighth Day of October 1980

[SEAL]

Attest:

SIDNEY A. DIAMOND

Attesting Officer     Commissioner of Patents and Trademarks